(12) United States Patent
Capozzi

(10) Patent No.: US 10,539,188 B2
(45) Date of Patent: Jan. 21, 2020

(54) END STOP CAP FOR A ROLLING BEARING

(71) Applicant: Aktiebolaget SKF, Gothenburg (SE)

(72) Inventor: Marco Giovanni Francesco Capozzi, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/106,115

(22) Filed: Aug. 21, 2018

(65) Prior Publication Data

US 2019/0085904 A1    Mar. 21, 2019

(30) Foreign Application Priority Data

Sep. 15, 2017   (IT) .................... 102017000103582

(51) Int. Cl.
| | |
|---|---|
| *F16C 33/72* | (2006.01) |
| *B61F 15/26* | (2006.01) |
| *F16C 35/063* | (2006.01) |
| *F16C 19/38* | (2006.01) |

(52) U.S. Cl.
CPC ............ *F16C 33/723* (2013.01); *B61F 15/26* (2013.01); *F16C 35/063* (2013.01); *F16C 19/386* (2013.01); *F16C 2326/10* (2013.01)

(58) Field of Classification Search
CPC .... F16C 2326/10; F16C 33/723; F16C 33/78; F16C 19/386; F16C 35/063; B61F 15/12; B61F 15/26; B65G 39/10
See application file for complete search history.

(56) References Cited

U.S. PATENT DOCUMENTS

| | | | | | |
|---|---|---|---|---|---|
| 3,623,761 | A | * | 11/1971 | Nadherny ............... | B61F 15/12 295/42.2 |
| 3,741,603 | A | * | 6/1973 | McLean, Jr. ............ | B61F 15/22 295/42.2 |
| 6,179,471 | B1 | * | 1/2001 | Moretti ................. | B60B 7/0013 384/448 |
| 9,346,475 | B2 | * | 5/2016 | Capozzi ................. | B61F 15/12 |

(Continued)

FOREIGN PATENT DOCUMENTS

| | | |
|---|---|---|
| DE | 102011004030 A1 | 8/2012 |
| EP | 2848491 A1 | 3/2015 |

(Continued)

*Primary Examiner* — Alan B Waits
(74) *Attorney, Agent, or Firm* — Garcia-Zamor Intellectual Property Law, LLC; Ruy Garcia-Zamor; Bryan Peckjian

(57) ABSTRACT

An end stop cap for a rolling bearing for mounting in a railway axle box of a respective support device. The cap being a concave disc delimited by a lateral wall having a symmetric axis, coaxial with a bearing's symmetric axis by an end wall, transverse to the symmetric axis, and by an elbow-shaped transition connecting the end and lateral walls. Holes extend through the end wall for fastening screws. The lateral wall terminates on the side opposite the end wall in an annular frontal surface which rests against a bearing ring. The end wall has a continuously variable thickness, in at least one radial direction passing through an symmetric axis of the holes in a radial direction between a maximum thickness located in a position substantially intermediate between an inner edge of the hole and the symmetric axis and a minimum thickness at the position of the symmetric axis.

2 Claims, 4 Drawing Sheets

(56) References Cited

U.S. PATENT DOCUMENTS

| | | | | |
|---|---|---|---|---|
| 2011/0064347 A1* | 3/2011 | Hubbard | ............... | F16C 35/063 384/564 |
| 2012/0082407 A1* | 4/2012 | Fetty | ....................... | B61F 15/22 384/459 |
| 2015/0078693 A1* | 3/2015 | Capozzi | .................. | B61F 15/12 384/459 |

FOREIGN PATENT DOCUMENTS

| | | |
|---|---|---|
| GB | 773279 A | 4/1957 |
| IT | TO2013000741 A1 | 3/2015 |
| WO | 0175320 A1 | 10/2001 |
| WO | 2006094031 A1 | 9/2006 |

* cited by examiner

END STOP CAP FOR A ROLLING BEARING

CROSS-REFERENCE

This application claims priority to Italian patent application no. 102017000103582 filed on Sep. 15, 2017, the contents of which are fully incorporated herein by reference.

TECHNOLOGICAL FIELD

The present invention relates to an axial end stop cap for a rolling bearing.

The present invention is suitable for application in the field of railway vehicles having axle boxes equipped with such caps, and the following description refers, by way of example, to this specific application without thereby losing its generality.

BACKGROUND

As is known, a railway vehicle is supported on a series of railway axles or shafts, each of which is composed of an axle on to which the wheels are fixed; each end of the axle is supported by an axle box linked by suspension to the carriage. As shown in FIG. 1, denoted as "Prior Art", each axle box 4 comprises a rolling bearing 5 mounted on a smaller-diameter end 3 of a railway axle 2, called the journal, and an end stop cap 11, which is fastened integrally to a free end 22 of the journal 3 by means of screws 12.

The end stop cap 11 is subjected to relatively high stresses which may cause its elastic deformation by bending, and patent application TO2013A000741, on behalf of the present applicant, describes a end stop cap 11 having an end wall 14 shaped so as to limit these deformations at the center of the end stop cap 11, which is usually made in the form of a concave disc and is bent inwards towards the journal, and at a peripherally outer edge of the cap, which is bent in such a way as to move axially away from the bearing. Although the stop cap 11 described above has proven to be of significant use for limiting these deformations, which, even if very small, may give rise to numerous problems, it has not proven to be as useful in terms of meeting the increasing requirements for weight reduction.

BRIEF SUMMARY OF THE PRESENT INVENTION

The object of the present invention is to provide an end stop cap for a rolling bearing which, while being less likely to become deformed even in the presence of relatively high bending stresses, may also be extremely low in weight.

According to the present invention, an end stop cap for a rolling bearing having the characteristics stated in the attached claims is provided.

BRIEF DESCRIPTION OF THE DRAWINGS

The invention will now be described with reference to the attached drawings, which show a non-limiting example of embodiment thereof, in which.

DETAILED DESCRIPTION OF THE PRESENT INVENTION

Figure 1:
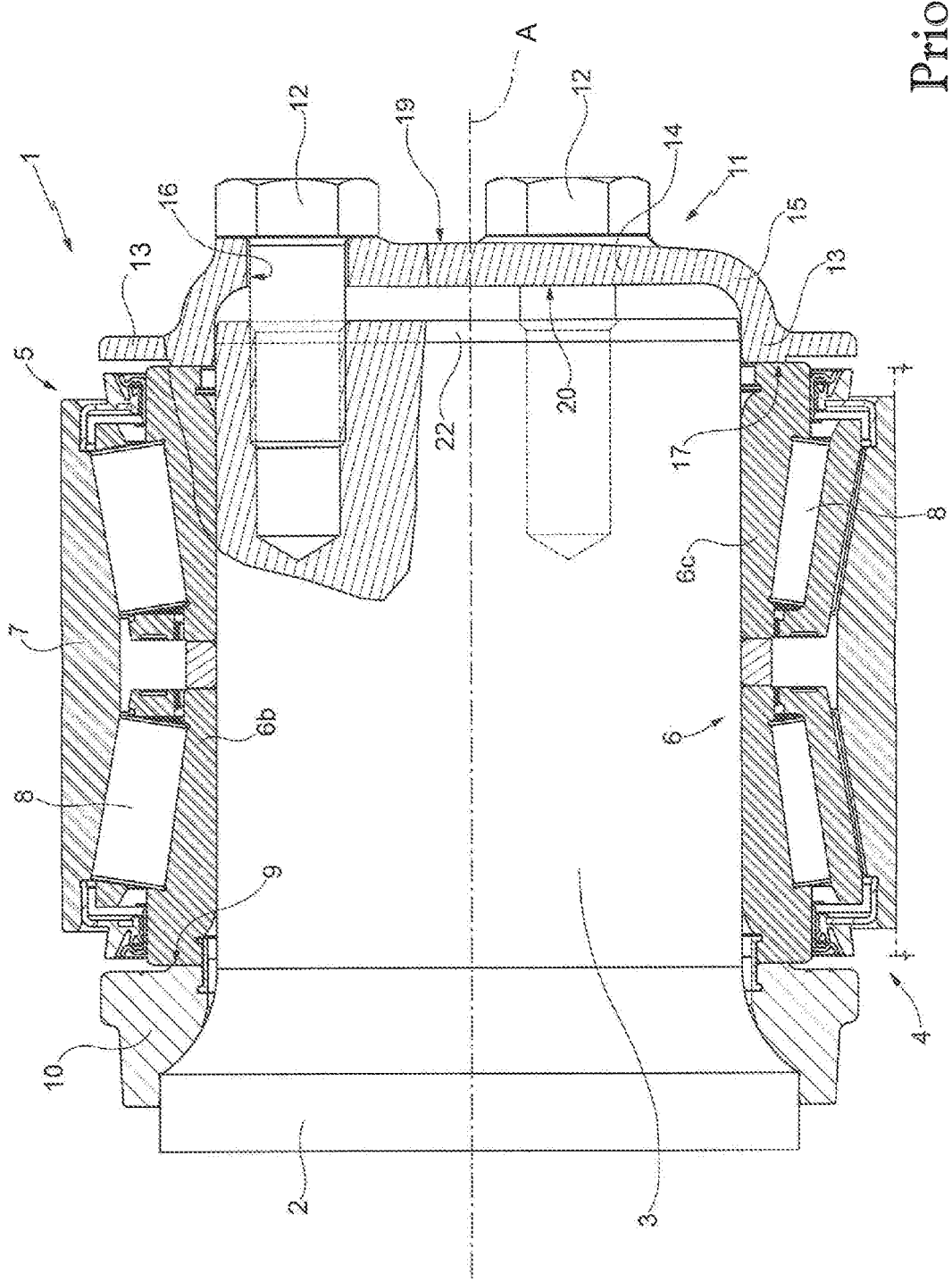
FIG. 1 presents "Prior Art" shown in a schematic illustration of a view in elevation and in radial cross section of an end of a railway axle and a known end stop cap for a rolling bearing.
Figure 2:
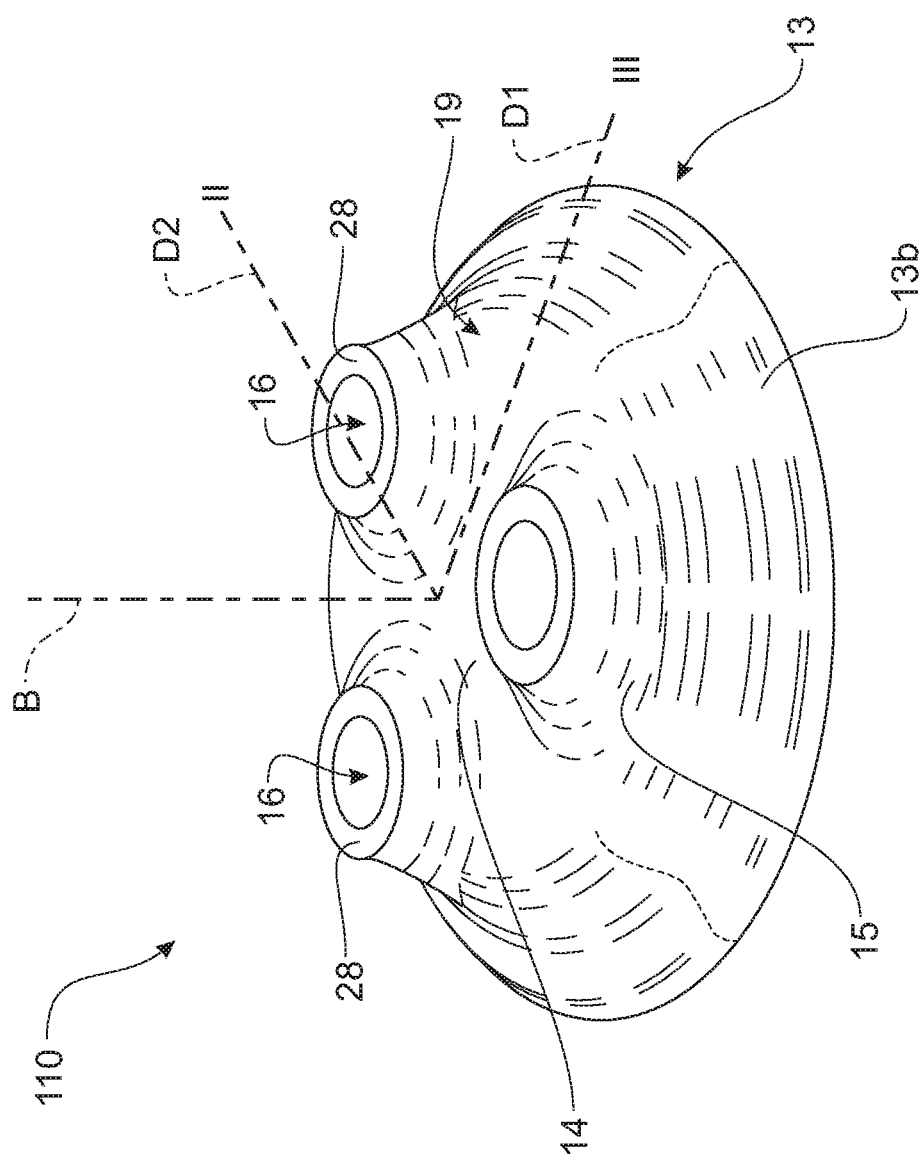
FIG. 2 presents a perspective view of an end stop cap for a rolling bearing according to the invention.

With reference to FIG. 2, the number 110 indicates the whole of an end stop cap for a rolling bearing 5 of a railway axle 2, which, together with the rolling bearing 5, is shown only partially in FIG. 1 and forms part of a known axle which, for the sake of simplicity, is not shown.

The axle 2 has respective smaller-diameter ends 3, only one of which is shown for the sake of simplicity, these ends also being known as journals, each of which is inserted into a respective rolling bearing 5, which has an axis of symmetry B and comprises an inner ring 6 divided into two inner ring portions 6b and 6c, an outer ring 7, and a double ring of revolving bodies 8.

The inner ring 6 of the rolling bearing 5, with its two ring portions 6b and 6c, is mounted on the journal 3 which is axially retained between a shoulder 9 carried integrally by the railway axle 2, being formed by a ring 10 in the present case, and an end stop cap 11 of a known type, mounted integrally on the journal 3 at the opposite end to the ring 10 by a series of screws 12, of which there are three arranged at 120° in the illustrated example.

With reference to FIG. 2, an end stop cap 110 for the bearing 5 made according to the teachings of the present invention will now be described, using, where possible, elements and reference numbers that have already been introduced.

The end stop cap 110 is made in the form of a concave disc delimited by an annular lateral wall 13 having an axis of symmetry B which is coaxial in use with the axis of symmetry A of the bearing 5, by an end wall 14 positioned transversely to the axis of symmetry B, and by an annular linking portion 15 which is elbow-shaped in radial cross section, connecting the end wall 14 to the lateral wall 13. The lateral part 13 has an annular portion 13a connected to the wall 15, an outer cylindrical portion 13b and a further annular connecting portion 13c which is elbow-shaped in radial section and connects the annular portion 13a to the cylindrical portion 13b.

The end wall 14 has a plurality of through holes 16 for the screws 12 for fastening the end stop cap 11, in use, to the railway axle 2, and the portion 13a of the lateral wall 13 terminates in its part opposite the end wall 14 in a frontal annular surface 17 adapted to bear, in use, against the inner ring 6 of the rolling bearing 5.

Figure 3:
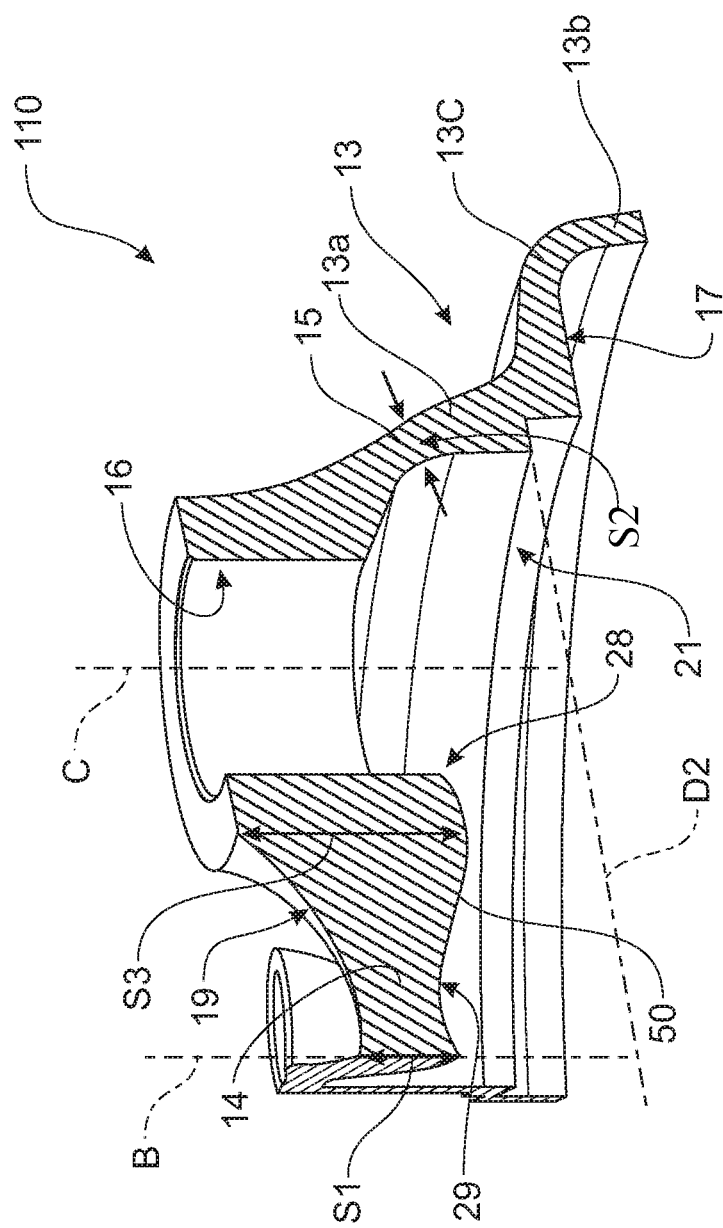
FIG. 3 presents, on an enlarged scale, a section taken along radial line II of FIG. 2, the section extending through the end stop cap for the rolling bearing of FIG. 2.
Figure 4:
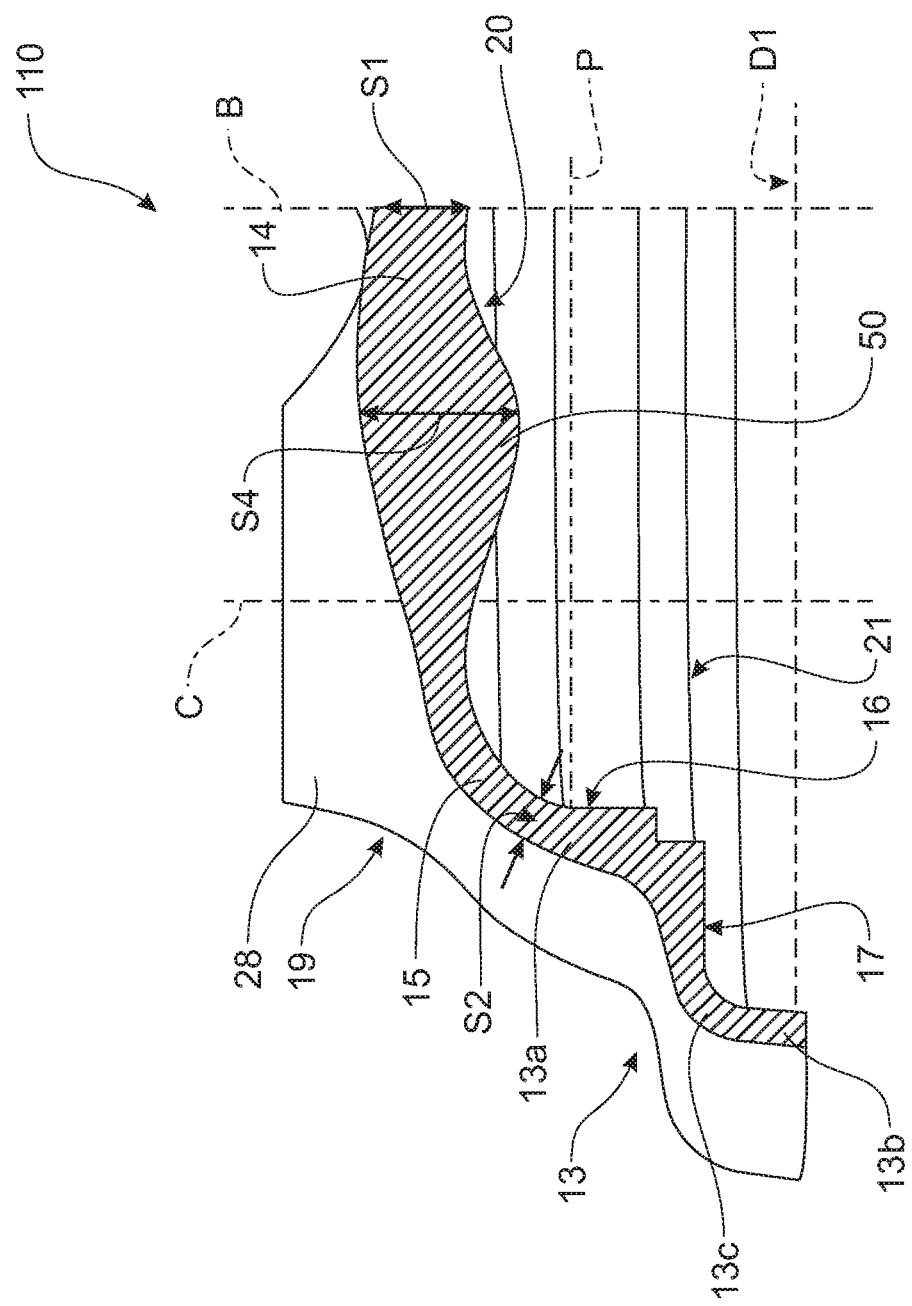
FIG. 4 presents, on a more enlarged scale, the section taken along radial line III of FIG. 2, the section extending through the end stop cap for the rolling bearing of FIG. 2.

With additional reference to FIG. 3 and FIG. 4, according to a first aspect of the invention, the end wall 14 has a thickness, measured in a direction parallel to the axis of symmetry B, which is variable, in a first radial direction D1 intermediate between two adjacent holes 16 and in a second radial direction D2 through an axis of symmetry C of any hole 16, in a continuous way between an intermediate thickness S1 located at the axis of symmetry A and a minimum thickness S2 located at a radially outer edge of the end stop cap 11 defined by the lateral wall 13. In particular, as shown in FIG. 3, the thickness of the end wall 14 in the first radial direction D2 has a maximum thickness S3 located in a substantially intermediate position between an outer edge 28 of the hole 16 and the axis of symmetry B, and decreases towards the axis of symmetry B to reach a minimum thickness S1, while, as shown in FIG. 4, the thickness of the end wall 14 in the second radial direction D1 has a maximum thickness S4 that is located in a substantially intermediate position between a circumference passing between the axes of symmetry C of the holes 14 and the axis of symmetry B, and, here again, decreases towards the axis of symmetry B to reach the minimum thickness S1.

In other words, the thickness of the end wall 14, in both the first radial direction D1 and the second radial direction D2, has an undulating profile, especially towards the inside of the cap 11, so that the maximum thickness S3 and S4 is concentrated solely and exclusively in the areas of greater mechanical stress, enabling the weight of the cap 11 to be reduced, and the undulating shape of the end wall 14 enables the mechanical stresses created by the load on the screws 12 to be distributed uniformly around each hole 16.

According to the invention, the outer edges 28 of the holes 16 are preferably positioned at a radial distance from the axis of symmetry B equal to the radial distance from the same axis of symmetry B of the aforesaid circumference passing between the axes of symmetry C of the holes 16.

In particular, the end wall 14 is delimited between an outer frontal surface 19 facing in the opposite direction from the annular frontal bearing surface 17 of the lateral wall 13 and an inner frontal surface 20 facing in the same direction as the annular frontal bearing surface 17 of the lateral wall 13 and delimiting, together with the lateral wall 13, an inner concavity or cavity 21 of the end stop cap 11 adapted to be at least partially coupled, in use, to a free end 22 of the journal 3 of the railway axle 2.

According to the invention, the outer frontal surface 19 and the inner frontal surface 20 of the end wall 14 are not parallel to one another, but follow different profiles, especially along the two directions D1 and D2, to impart the undulating shape described above to the end stop cap 11. Additionally, the outer frontal surface 19 and the inner frontal surface 20 of the end wall 14 both have multiple curvature. Since the outer edges 28 of the holes 16 and the aforesaid circumference passing between the axes of symmetry C of the holes 16 are positioned at the same radial distance from the axis of symmetry B, the inner frontal surface 20 will have a single circumferential raised area 50 at the same distance from the axis of symmetry B, starting from the axis of symmetry B itself. The thickness of this circumferential raised area 50 will have the maximum value S3 or alternatively the maximum value S4 around the axis of symmetry B, these values preferably being, possibly, of the same magnitude in specific applications. Alternatively, according to a preferred embodiment which is not illustrated, but may easily be deduced from the above, the maximum thickness could be reached along the circumferential raised area 50 solely at the positions of the holes 16.

Additionally, according to a preferred aspect of the invention, the outer frontal surface 19 and the inner frontal surface 20 of the end wall 14 have opposed curvatures, at least at the positions of the thicknesses S3 and S4, and, in both cases, the maximum thickness is reached above a plane P transverse to the axis B, that is to say in an area of the end stop cap 11 lying between the plane P and the surface 20, to avoid any possible problem of interference with the mounting of the cap 11 on the axle 2.

Finally, the invention consists in making the end wall 14 of the cap 11 which, in use, receives the pressure of the screws 12 with a thickness, measured in the direction D1 and D2, which varies continuously in the radial direction between a minimum S1 located at the axis of symmetry A and a maximum S3 or S4 located where the mechanical stresses created by the load of the screws 12 will be greatest, and in delimiting this end wall 14 of variable thickness between an outer frontal surface 19, facing away from the bearing 5, and an inner frontal surface 20, facing towards the bearing 5, these two surfaces being undulating in the radial direction and having opposed radii of curvature at least at the position of the maximum S3 or S4.

Surprisingly, by making the cap 11 on the basis of the dimensional parameters described above, instead of with an end wall of constant thickness and parallel surfaces, as in the prior art, the overall weight of the cap 11 can be reduced for the same bending resistance, and therefore a radially outer edge 18 is not deformed in use under the stress of the pressure of the screws 12.

Finally, the cap 11 has thickened areas, at the position of the holes 16 and on the outer frontal surface 19 only, these areas forming flattened bosses 28 adapted to receive the heads of the screws 12 which bear on them. These bosses 28 are formed on the end wall 14 in a radial position corresponding to the transition between the end of the end wall 14 and the annular linking portion 15, to provide better distribution of the stresses caused in use by the screws 12 over the whole cap 11.

| Reference Element List | |
|---|---|
| Ref. No. | Description |
| 1 | support device for a railway axle |
| 2 | railway axle |
| 3 | smaller diameter end of the axle (journal) |
| 4 | axle box |
| 5 | rolling bearing |
| 6 | inner ring |
| 6b | first of two inner ring portions |
| 6c | second of two inner ring portions |
| 7 | outer ring |
| 8 | double ring of revolving bodies |
| 9 | shoulder |
| 10 | ring |
| 11 | end stop cap |
| 12 | screws |
| 13 | annular lateral wall |
| 13a | annular portion |
| 13b | cylindrical portion |
| 13c | further annular connecting portion which is elbow-shaped in radial section and connects the annular portion to the cylindrical portion |
| 14 | end wall |
| 15 | annular linking portion |
| 16 | hole |
| 17 | frontal annular surface |
| 18 | radially outer edge |
| 19 | outer frontal surface facing in the opposite direction from the annular frontal bearing surface |
| 20 | inner frontal surface |
| 21 | inner concavity or cavity of the end stop cap |
| 22 | free end of the journal |
| 28 | outer edges of the holes |
| 50 | single circumferential raised area |
| 110 | end stop cap |
| A | axis of symmetry of the bearing |
| B | axis of symmetry of the respective rolling bearing |
| C | axes of symmetry of the holes |
| D1 | first radial direction |
| D2 | second radial direction |
| P | plane of the inner frontal surface |
| S1 | intermediate thickness |
| S2 | minimum thickness |
| S3 | maximum value of a thickness of the circumferential raised area |
| S4 | maximum value around the axis of symmetry of the circumferential raised area |

What is claimed is:

1. An end stop cap for a rolling bearing for mounting in a railway axle box of a support device for a railway axle, the end stop cap being shaped as a concave disc delimited by an annular lateral wall having a lateral wall axis of symmetry which is coaxial in use with a bearing axis of symmetry, the end stop cap comprising:
   (a) an end wall positioned transversely to the lateral wall axis of symmetry, and
   (b) an elbow-shaped annular linking portion connecting the end wall to the annular lateral wall;
   the end wall being provided with a plurality of through holes for respective screws sized and located to fasten the cap to the axle, each of the plurality of through holes having a hole axis of symmetry which is parallel to the lateral wall axis of symmetry;
   the annular lateral wall terminating on an opposite side from the end wall in an annular frontal surface adapted to bear against a ring of the bearing;
   the end wall of the end stop cap having a thickness, measured parallel to the lateral wall axis of symmetry which is continuously variable along a second radial direction which intersects both the lateral wall axis of symmetry and the hole axis of symmetry of one of the plurality of through holes, the thickness being variable between a first maximum located at a position substantially intermediate between an inner edge of one of the plurality of through holes and the lateral wall axis of symmetry, a minimum thickness of the end wall along the second radial direction is measured perpendicular to an inner surface of the end wall and is located at a radially outer edge of the end wall;
   wherein the thickness of the wall as measured along a first radial direction which intersects the lateral wall axis of symmetry and passes between two adjacent holes has a respective second maximum in a position substantially intermediate between the two adjacent holes and along a circumference passing between the hole axis of symmetry of the two adjacent holes and the axis of symmetry of the bearing;
   wherein the end wall is delimited between an outer frontal surface facing in the opposite direction from the annular frontal bearing surface of the lateral wall and an inner frontal surface facing in the same direction as the annular frontal bearing surface of the lateral wall and delimiting, together with the lateral wall, a concavity of the cap adapted to be at least partially coupled to a free end of the axle; and
   the inner frontal surface of the end wall having a profile with at least one undulation.

2. An end stop cap for a rolling bearing for mounting in a railway axle box of a support device for a railway axle, the end stop cap being shaped as a concave disc delimited by an annular lateral wall having a lateral wall axis of symmetry which is coaxial in use with a bearing axis of symmetry, the end stop cap comprising:
   (a) an end wall positioned transversely to the lateral wall axis of symmetry, and
   (b) an elbow-shaped annular linking portion connecting the end wall to the annular lateral wall;
   the end wall being provided with a plurality of through holes for respective screws sized and located to fasten the cap to the axle, each of the plurality of through holes having a hole axis of symmetry which is parallel to the lateral wall axis of symmetry;
   the annular lateral wall terminating on an opposite side from the end wall in an annular frontal surface adapted to bear against a ring of the bearing;
   the end wall of the end stop cap having a thickness, measured parallel to the lateral wall axis of symmetry which is continuously variable along a second radial direction which intersects both the lateral wall axis of symmetry and the hole axis of symmetry of one of the plurality of through holes, the thickness being variable between a first maximum located at a position substantially intermediate between an inner edge of one of the plurality of through holes and the lateral wall axis of symmetry, a minimum thickness of the end wall along the second radial direction is measured perpendicular to an inner surface of the end wall and is located at a radially outer edge of the end wall;
   wherein the end wall is delimited between an outer frontal surface facing in the opposite direction from the annular frontal bearing surface of the lateral wall and an inner frontal surface facing in the same direction as the annular frontal bearing surface of the lateral wall and delimiting, together with the lateral wall, a concavity of the cap adapted to be at least partially coupled to a free end of the axle;
   the inner frontal surface of the end wall having a profile with at least one undulation.

* * * * *